United States Patent
Jiang et al.

(10) Patent No.: US 10,034,334 B2
(45) Date of Patent: Jul. 24, 2018

(54) DRIVER CIRCUIT WITH EXTENDED OPERATION RANGE

(71) Applicant: PHILIPS LIGHTING HOLDING B.V., Eindhoven (NL)

(72) Inventors: Junmin Jiang, Eindhoven (NL); Jie Fu, Eindhoven (NL); Harald Josef Gunther Radermacher, Eindhoven (NL); Shu Xu, Eindhoven (NL); Julia Delos Ayllon, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/119,700

(22) PCT Filed: Feb. 13, 2015

(86) PCT No.: PCT/EP2015/053143
§ 371 (c)(1),
(2) Date: Aug. 17, 2016

(87) PCT Pub. No.: WO2015/124514
PCT Pub. Date: Aug. 27, 2015

(65) Prior Publication Data
US 2017/0055322 A1 Feb. 23, 2017

(30) Foreign Application Priority Data

Feb. 24, 2014 (WO) ................ PCT/CN2014/000170
Apr. 10, 2014 (EP) ..................................... 14164134

(51) Int. Cl.
| H05B 33/08 | (2006.01) |
| H02M 3/158 | (2006.01) |
| H02M 3/07 | (2006.01) |

(52) U.S. Cl.
CPC .......... *H05B 33/0815* (2013.01); *H02M 3/07* (2013.01); *H02M 3/158* (2013.01); *Y02B 20/346* (2013.01)

(58) Field of Classification Search
CPC ........ H02M 3/06; H02M 3/07; H05B 39/047; H05B 33/0815
See application file for complete search history.

(56) References Cited

U.S. PATENT DOCUMENTS

| 8,854,019 | B1 * | 10/2014 | Levesque ................ | H02M 3/07 323/266 |
| 2009/0072800 | A1 * | 3/2009 | Ramadass ............... | H02M 3/07 323/271 |
| 2009/0121781 | A1 | 5/2009 | Oyama et al. | |
| 2009/0322384 | A1 * | 12/2009 | Oraw ...................... | H02M 3/07 327/112 |
| 2013/0234785 | A1 | 9/2013 | Dai et al. | |
| 2013/0257176 | A1 | 10/2013 | Crespi et al. | |

(Continued)

OTHER PUBLICATIONS

V. Ng, "Switched Capacitor DC-DC Converter: Superior Where the Buck Converter has Dominated", Aug. 17, 2011, retrieved from the web: http://search.proquest/.com/docview/1525821014, pp. 34-67.

(Continued)

*Primary Examiner* — Jason M Crawford
(74) *Attorney, Agent, or Firm* — Akarsh P. Belagodu

(57) ABSTRACT

A system comprising a driver circuit wherein the driver circuit comprises a converter. The system further comprises a controller operable to control a ratio between an input voltage supplied to the driver circuit and a target output voltage to be output from the driver circuit by varying a pulse width modulated signal, and by switching between operating modes of said converter. The controller is configured to determine that the driver circuit is operating in an undesired state caused by a combination of the duty cycle and the operating mode of the converter. The system further comprises a resistance adjustment circuit configured to adjust an equivalent output resistance of the driver circuit in response to the controller determining that the driver circuit is operating in an undesired state.

15 Claims, 11 Drawing Sheets

(56) References Cited

U.S. PATENT DOCUMENTS

| | | | |
|---|---|---|---|
| 2014/0043010 A1 | 2/2014 | Salem | |
| 2016/0056714 A1* | 2/2016 | Ek | H02M 3/07 323/271 |
| 2016/0190917 A1* | 6/2016 | Delos Ayllon | H02M 3/158 315/307 |
| 2016/0234895 A1* | 8/2016 | Delos Ayllon | H05B 33/0815 |

OTHER PUBLICATIONS

M.D. Seeman, "A Design Methodology for Switched-Capacitor DC-DC Converters", May 21, 2009, retrieved from the web: http://search.proquest.com/docview/304846283, pp. 1-251.

F. Haq, "Low Power Switched Capacitor DC-DC Converters for Low Power Transceiver Applications", Masters of Science Thesis, Tampere University of Technology, Faculty of Computing and Electrical Engineering Council Meeting of Oct. 5, 2011, pp. 1-72.

M.K. Alam, "A High-Efficiency Modular Switched-Capacitor Converter with Continuously Variable Conversion Ratio", Dept. of Elect. & Comput. Eng., Univ. of Utah, Salt Lake City, UT, USA, Control and Modeling for Power Electronics (COMPEL), 2012 IEEE 13th Workshop, Jun. 10-13, 2012, 2 pages.

J. Delos, "On the Impedance Modeling of Switched Capacitor Converters with Arbitrary Output Nodes", Philips Research Netherlands, The Netherlands, Power Electronics and Applications (EPE), 2013 15th European Converence, Sep. 2-6, 2013, 2 pages.

M. Meola, "Design and Modeling of a Digital Controller for Multi-Mode DC-DC Converters", Universita' Degli Studi Di Trieste, dated 2008-2009, pp. 1-172.

M.D. Seeman, "Analytical and Practical Analysis of Switched-Capacitor DC-DC Converters", Master of Science in Electrical Engineering and Computer Science, University of California at Berkley, undated, pp. 1-64.

\* cited by examiner

DRIVER CIRCUIT WITH EXTENDED OPERATION RANGE

CROSS-REFERENCE TO PRIOR APPLICATIONS

This application is the U.S. National Phase application under 35 U.S.C. § 371 of International Application No. PCT/EP2015/053143, filed on Feb. 13, 2015, which claims the benefit of European Patent Application No. 14164134.0, filed on Apr. 10, 2014 and Chinese Patent Application No. PCT/CN2014/000170, filed on Feb. 24, 2014. These applications are hereby incorporated by reference herein.

TECHNICAL FIELD

The invention relates to the field of driver circuits, and more particularly to driver circuits for Light Emitting Diode (LED) light sources.

BACKGROUND

The Solid State Lighting (SSL) Industry's demand for small and compact power management units for LEDs is increasing. This demand is even stronger in the field of Power LEDs, for which energy from the power supply has to be delivered in the form of a constant current as efficiently as possible.

"Driver on board" technology is known where the SSL light source and the driver are to be combined on one carrier board. Examples of this may be (i) SSL light sources being LEDs (with or without light conversion, such as direct, vicinity, remote or any other phosphor), combined with at least part of the driver on a printed circuit board; (ii) SSL light sources being LEDs, combined with at least part of the driver on another carrier, such as a silicon wafer, glass plate, (thermally enhanced) plastic carrier; (iii) SSL light sources being OLEDs, combined with at least part of the driver on the carrier of the OLED; (iv) Combination of laser and driver; and (v) Combination of light source, and other signal or power electronics.

In these "driver on board" scenarios, size is one constraint, either as a limitation in the footprint (the "real estate" of the driver circuit occupied on the board) and/or the height of the components. These limitations may originate from optical constraints, for example high components may block part of the light emission from a light source, or large surface components may impact the total reflectivity of a light mixing chamber.

To one end small size of the driver circuit is a target, however small size comes with low volume of components. To the other end high performance is the target, however low volume of components results in relatively limited performance, which challenges driver circuit design.

Multimode driver circuits are typically implemented by using a power converter. Multimode driver power converters allow regulating a constant output voltage with a plurality of ranges of conversion ratios, in order to cope with the variations of input voltage. The input supply voltage may be from either an Alternating Current (AC) input (from power grid) or a Direct Current (DC) input (battery, AC rectified voltage etc.). Voltage variations from these sources are unavoidable. For example, when power is coming from AC power grid, intrinsic quality of electrical generator and transmission loss through the wire will typically result in a 10% error providing the AC supply voltage to users. Adapters are used to rectify AC voltage to DC voltage and are controlled by electronic circuits. The performance (DC regulation ability, process variation, etc.) of these electronic circuits will provide different DC voltages. For a portable device powered by a lithium battery, the voltage from the battery will typically vary from 4.2V (fully charged) to 2.7V (fully used). The power conversion ratio is essentially proportional to the duty cycle in each operating range, wherein desired conversion ratio can typically be achieved through adjusting the duty cycle of a Pulse Width Modulation (PWM) signal.

SUMMARY

The inventors have recognised that at the boundaries of each operating range of a multimode power converter, efficiency falls rapidly, possibly to zero, resulting in a very limited performance of the converter in certain areas. Such efficiency "gaps" become a significant disadvantage of multi-mode converters and largely constrain their application.

The invention proposes to fill in such gaps, by covering the total required range of conversion ratios with one topology.

According to one aspect of the present invention there is provided a system comprising: a driver circuit comprising a voltage converter; a controller operable to control a ratio between an input voltage supplied to the driver circuit and a target output voltage to be output from the driver circuit by varying a duty cycle of a pulse width modulated signal, and by switching between operating modes of said voltage converter; wherein the controller is configured to determine that the driver circuit is operating in an undesired state caused by a combination of the duty cycle and the operating mode of the converter; and a resistance adjustment circuit configured to adjust an equivalent output resistance of the driver circuit in response to said determination.

In embodiments, the driver circuit is operable to provide an output voltage at a varying efficiency dependent on the ratio, wherein the undesired state corresponds to a region of a relationship between the efficiency and the radio.

The resistance adjustment circuit may be configured to adjust the equivalent output resistance of the driver circuit by controlling a gate drive voltage output to switches of the voltage converter.

The resistance adjustment circuit may be configured to adjust the equivalent output resistance of the driver circuit by controlling a switching frequency of switches of the voltage converter.

The resistance adjustment circuit may be configured to adjust the equivalent output resistance of the driver circuit by controlling a dead time associated with switches of the voltage converter.

The resistance adjustment circuit may be configured to adjust the equivalent output resistance of the driver circuit based on receiving an error signal, said error signal generated based on comparing a reference voltage and a sense voltage.

The controller may be configured to determine that the driver circuit is operating in an undesired state based on said ratio.

The controller may be configured to determine that the driver circuit is operating in an undesired state based on the duty cycle of the pulse width modulated signal.

The controller may be configured to determine that the driver circuit is operating in an undesired state based on the input voltage supplied to the driver circuit.

The controller may be configured to determine that the driver circuit is operating in an undesired state based on determining the efficiency of the driver circuit.

The controller may be configured to constrain the duty cycle of the pulse width modulated signal to be limited within a limited duty cycle range.

The controller may be configured to constrain the duty cycle of a pulse width modulated signal to be at a constant value within the limited duty cycle range in response to determining that the driver circuit is operating in an undesired state.

The voltage converter may be formed by a switched capacitor converter comprising a first set of switches and a second set of switches.

The voltage converter may be based on a Dickson ladder topology.

According to another aspect of the present invention there is provided a light module comprising at least one light source and the system described herein wherein the driver circuit provides an output voltage that drives said at least one light source.

According to a further aspect of the present invention there is provided a computer program product for controlling a driver circuit comprising a voltage converter, and a resistance adjustment circuit, the computer program product comprising code embodied on a computer-readable medium and being configured so as when executed on a processor to: control a ratio between an input voltage supplied to the driver circuit and a target output voltage to be output from the driver circuit by varying a duty cycle of a pulse width modulated signal, and by switching between operating modes of said voltage converter; determine that the driver circuit is operating in an undesired state caused by a combination of the duty cycle and the operating mode of the converter; and supply the pulse width modulated signal to the resistance adjustment circuit to adjust an equivalent output resistance of the driver circuit in response to said determination.

These and other aspects will be apparent from the embodiments described in the following. The scope of the present disclosure is not intended to be limited by this summary nor to implementations that necessarily solve any or all of the disadvantages noted.

BRIEF DESCRIPTION OF THE DRAWINGS

For a better understanding of the present disclosure and to show how embodiments may be put into effect, reference is made to the accompanying drawings in which.

DETAILED DESCRIPTION

For a driver-on-board power converter, a fundamental requirement is the ability to operate in multiple modes, which can cover various electrical specifications e.g. input or output voltage, conversion ratio, efficiency, etc.

Switched Mode Power Supplies (SMPS) driver circuits using capacitive energy storage—SMPS notably including Switched Capacitor (SC) Converters, also called Charge Pumps (CP)—can provide highly efficient DC-to-DC voltage conversion with only the use of capacitors and semiconductor switches. An SCC converter may produce a regulated output voltage by either stepping up or stepping down the input voltage.

The efficiency, $\eta$, of an SC converter can be expressed as function of the voltage transfer ratio independent of switch resistances:

$$\eta = \frac{V_o}{M \cdot V_{in}} = \frac{V_o}{V_T}$$

where $V_o$ is the output voltage of the converter, $V_{in}$ is the input voltage of the converter, $V_T$ is the target voltage and M is the conversion ratio.

A multimode power converter may have multiple desired operating conditions, which are separated by undesired operating conditions. In particular, a multimode power converter may be able to supply power in a desired fashion to at least one load coupled to least one output of the converter when the voltage, required by the load is either in range $V_{o1}$ or in range $V_{o2}$, with:

$$V_a > V_{o1} > V_b$$

$$V_c > V_{o2} > V_d$$

wherein $V_b > V_b$.

So, when the voltage required by the load is in the range $V_{o3}$ where:

$$V_b < V_{o3} < V_c$$

the converter may not operate at all, or only with very limited performance.

These voltage "gaps" cause the efficiency of the SC converter to fall rapidly, even to zero.

Figure 1:
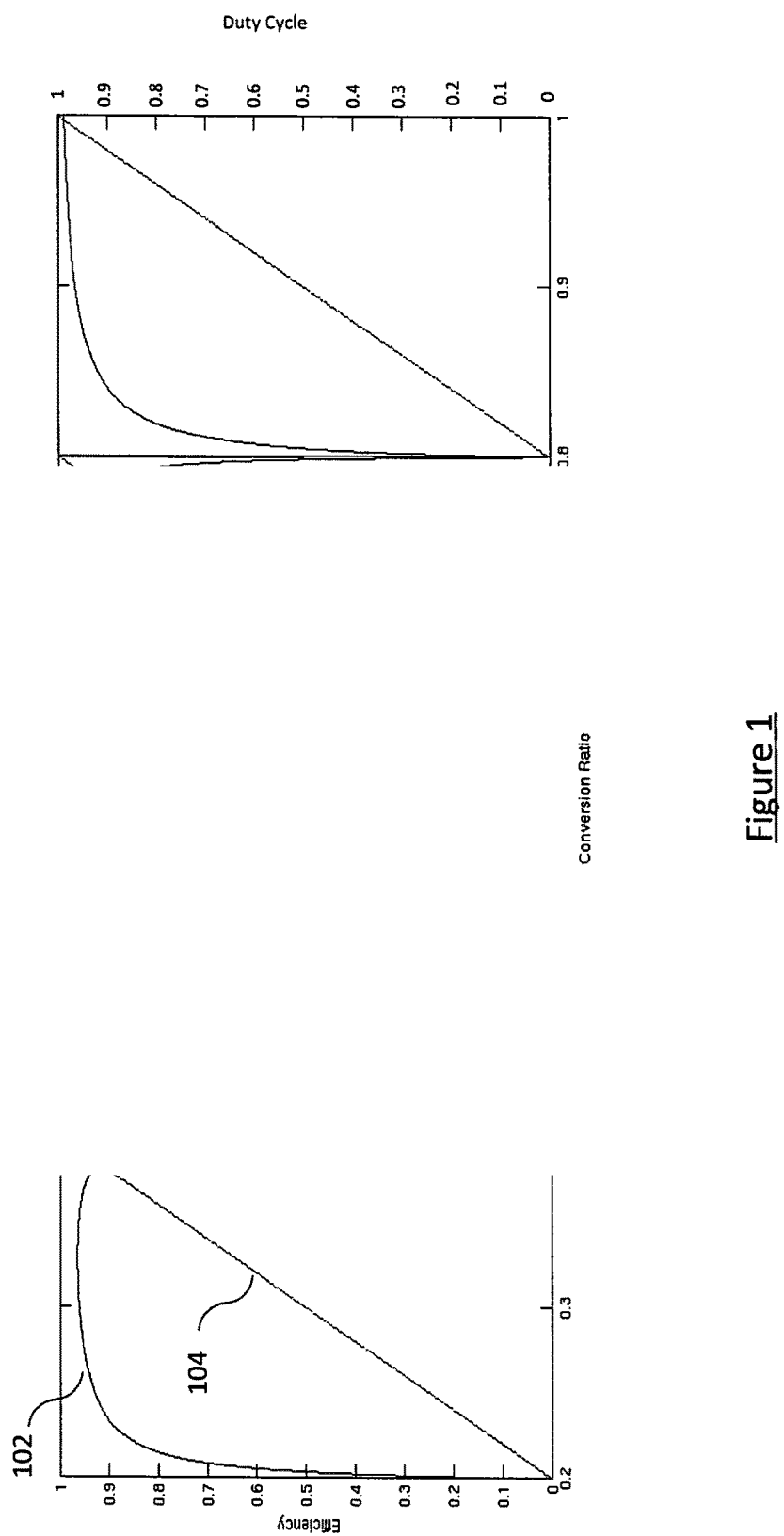
FIG. 1 illustrates a typical curve of efficiency with conversion ratio and duty cycle of a multimode converter.

FIG. 1 shows a typical efficiency curve 102 and duty cycle curve 104 with conversion ratio of a step down SC power converter which is designed with four operating modes which can provide four ranges of conversion ratio. This enables the power converter to be applied in wide voltage range applications.

Functionally, when regulating a constant output voltage, four ranges of conversion ratio (0.2 to 0.4, 0.4 to 0.6, 0.6 to 0.8 and 0.8 to 1) are available to meet the variation of input voltage. Therefore, output voltage could be easily chosen from ranges below:

$0.2V_{in} < V_{o1} < 0.4V$ $0.4V_{in} < V_{o2} < 0.6V_{in}$ $0.6V_{in} < V_{o3} < 0.8V_{in}$ $0.8V_{in} < V_{o4} < V_{in}$

As shown in FIG. 1, the conversion ratio is proportional to the duty cycle with each operating mode. Thus, tuning the duty cycle e.g. using Pulse Width Modulation (PWM) is the general method to achieve a desired conversion ratio.

However, at the boundaries of each operating mode, where the target conversion ratio is 0.2, 0.4, 0.6 and 0.8, it can be seen that efficiency falls rapidly, even to zero. Thus the power converter achieves very limited performance at these boundaries. It can be seen from FIG. 1 that the efficiency falls rapidly when the duty cycle approaches zero and when the duty cycle approaches one.

Figure 2:
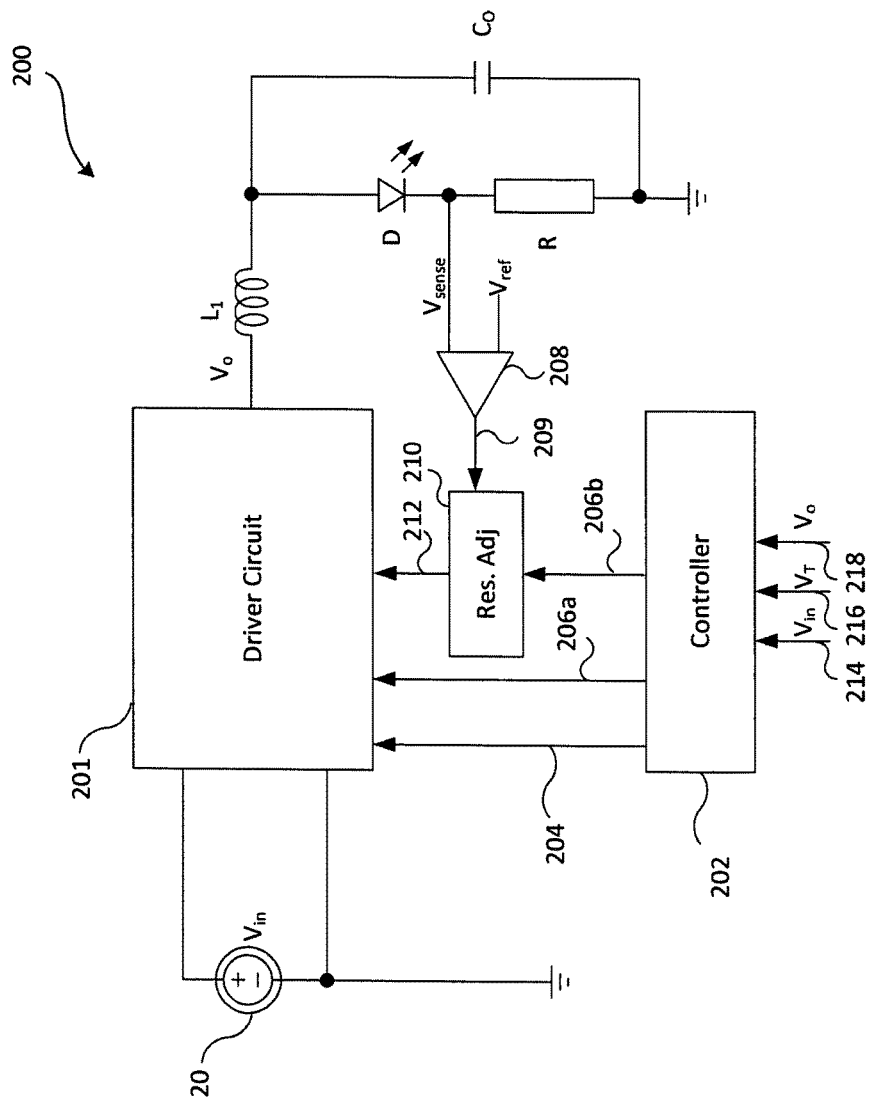
FIG. 2 shows a schematic block diagram of an apparatus according to an exemplary embodiment of the present invention.

These efficiency "gaps" are closed by embodiments of the present invention. That is, embodiments of the present invention extend the operating range of a driver circuit. Reference is now made to FIG. 2 which illustrates a system 200. The system 200 comprises a power supply 20, which supplies an input voltage $V_{in}$ to a driver circuit 201.

In the example system 200 shown in FIG. 2, the driver circuit 201 is used to drive an LED (D). However embodiments are not limited to only addressing driving of light loads, but also other applications, wherein size constraints similarly apply (e.g. in devices such as smart phones, laptop PCs and other portable devices, which need slim and compact electronic design).

Figure 3:
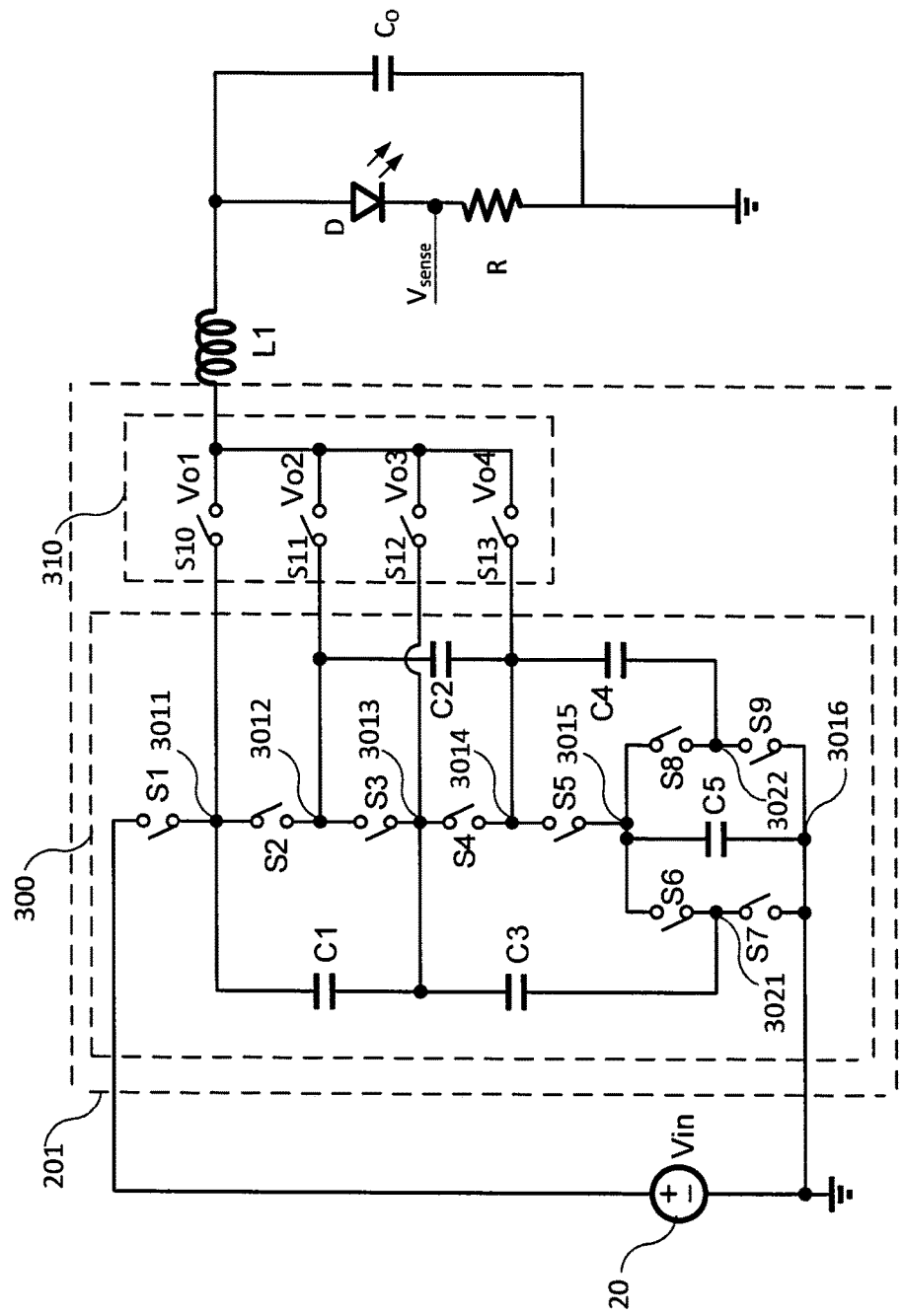
FIG. 3 shows an LED driver circuit according to an exemplary embodiment of the present invention.

An example driver circuit 201 is shown in FIG. 3. As shown in FIG. 3, the driving unit 201 can comprise a voltage converter 300, for example a charge pump that can be based on a SC Converter, for example of the Ladder topology type. The driving unit 201 is supplied by an input voltage $V_{in}$ supplied by the power supply 20, which can be part of the LED driver or external to the LED driver.

In the exemplary embodiment illustrated by FIG. 3, the driving unit 201 comprises a so-called Dickson Ladder converter forming the voltage converter 300. It shall be observed that other SCC topologies can be used, such as standard ladder, Fibonacci, or series-parallel topologies for instance.

The illustrated exemplary embodiment uses a Dickson Ladder topology based on five capacitors C1 to C5 and nine switches S1 to S9 of the single pole, single throw type. More specifically, the driving unit 201 comprises two flying ladders, each flying ladder comprising two capacitors: one first flying ladder comprises a first capacitor C1 in series with a third capacitor C3, and a second flying ladder comprises a second capacitor C2 in series with a fourth capacitor C4.

The driving unit 201 further comprises six central nodes 3011 to 3016. A first switch S1 selectively connects the first central node 3011 to the positive terminal of the power supply 20. A second switch S2 selectively connects the first central node 3011 to the second central node 3012. A third switch S3 selectively connects the second node 3012 to the third central node 3013. A fourth switch S4 selectively connects the third central node 3013 to the fourth central node 3014. A fifth switch S5 selectively connects the fourth central node 3014 to the fifth central node 3015. A fifth capacitor S5 is placed between the fifth central node 3015 and one sixth central node 3016. The sixth central node 3016 is connected to the negative terminal of the power supply 20.

The first flying ladder comprising the first and third capacitors C1, C3 is located between the first central node 3011 and a first secondary node 3021. A sixth switch S6 selectively connects the first secondary node 3021 to the fifth central node 3015; a seventh switch S7 selectively connects the first secondary node 3021 to the sixth central node 3016. A node in-between first capacitor C1 and third capacitor C3 is connected to the third central node 3013.

The second flying ladder comprising the second and fourth capacitors C2, C4 is located between the second central node 3012 and a second secondary node 3022. An eighth switch S8 selectively connects the second secondary node 3022 to the fifth central node 3015; a ninth switch S9 selectively connects the second secondary node 3022 to the sixth central node 3016. A node in-between second capacitor C2 and fourth capacitor C4 is connected to the fourth central node 3014.

The two flying ladders are oppositely phased, thanks to an adequate sequence of opening and closing the switches S1 to S9.

The controller 202 (shown in FIG. 2) is configured to generate a first PWM signal to control switches S1, S3, S5, S6, and S9 of the driver circuit 201, and a second PWM signal to control switches S2, S4, S7, and S8 of the driver circuit 201. The first PWM signal is used to control switches S1, S3, S5, S6, and S9 to be in a given state during a first time phase ϕ1, for instance turned on, while the second PWM signal is used to control switches S2, S4, S7, and S8 to be in the opposite state, for instance turned off. During a successive second time phase ϕ2, the states of all the switches can be reversed. That is, first PWM signal has a duty cycle D, and the second PWM signal has a duty cycle of 1−D. The first PWM signal and the second PWM signal generated by the controller 202 may be supplied to the driver circuit 201 (as shown by connection 206a). Alternatively the first PWM signal and the second PWM signal generated by the controller 202 may be supplied to a resistance adjustment circuit 210, as will be described in more detail below.

The driver circuit 201 can further comprise a multiplexer 310 formed by four multiplexer switches S10, S11, S12, S13 connected to the first four central nodes 3011, 3012, 3013, 3014 respectively. The multiplexer 310 selectively connects one of the internal nodes of the voltage converter 300, that is: either one of the first four central nodes 3011, 3012, 3013, 3014, one at a time, outputting a driver voltage as a function of respective intermediate voltages at the first four central nodes 3011, 3012, 3013, 3014 respectively.

The multiplexer 310 selectively closes one of the multiplexer switches S10, S11, S12, S13 based on a mode selection control signal 204 received from the controller 202. Thus the multiplexer 310 controls the operating mode of the driver circuit 201.

The output of the multiplexer 310 can be connected to a filter inductor $L_1$ placed in series with the LED D. A capacitor $C_o$ can be placed in parallel with the LED D and a load resistor $R_L$. The output filter formed by the filter inductor $L_1$, the capacitor $C_o$, and the load resistor $R_L$ filters the internal pulsating voltages of the SC converter, supplying a constant current to the LED D.

As shown in FIG. 2, a sense voltage $V_{sense}$ is supplied to a comparator 208 which compares the sense voltage $V_{sense}$ with a reference voltage $V_{ref}$ to generate an error signal 209 which is supplied to the resistance adjustment circuit 210. The reference voltage $V_{ref}$ may be set to the output voltage that is required for a certain application by an end-user. As a mere example, the reference voltage $V_{ref}$ may be set to for example 5V or 3.3V. In other cases, the reference voltage $V_{ref}$ may be set to a fixed reference voltage, for example 1.2V, and an adjustable resistor ladder provided, the resistance of which can be adjusted by an end-user according to the output voltage that is required for a certain application. The sense voltage $V_{sense}$ is proportional to, and thus provides a measure of, the output current $I_o$ of the driver circuit 201. The error signal 209 is generated by the comparator 208 by subtracting the sense voltage $V_{sense}$ from the reference voltage $V_{ref}$. The comparator 208 may be implemented using for example an operational amplifier. The comparator 208 supplies the error signal 209 to the resistance adjustment circuit 210.

As shown in FIG. 2, the controller 202 receives the input voltage $V_{in}$ as a first input signal 214, the target voltage $V_T$ as a second input signal 216, and the output voltage $V_o$ as a third input signal 218. Based on the input voltage $V_{in}$ and the target voltage $V_T$, the control module is configured to dynamically determine a required conversion ratio M (where $M=V_T/V_{in}$). The controller 202 is configured to dynamically determine a mode of operation and duty cycle D that is needed to provide the required conversion ratio M (the conversion ratio M is proportional to the duty cycle with each operating mode). It will be appreciated that the controller 202 may be pre-configured with the target voltage $V_T$, and in such scenarios the controller 202 may not receive the target voltage $V_T$ using the second input signal 216.

Figure 4:
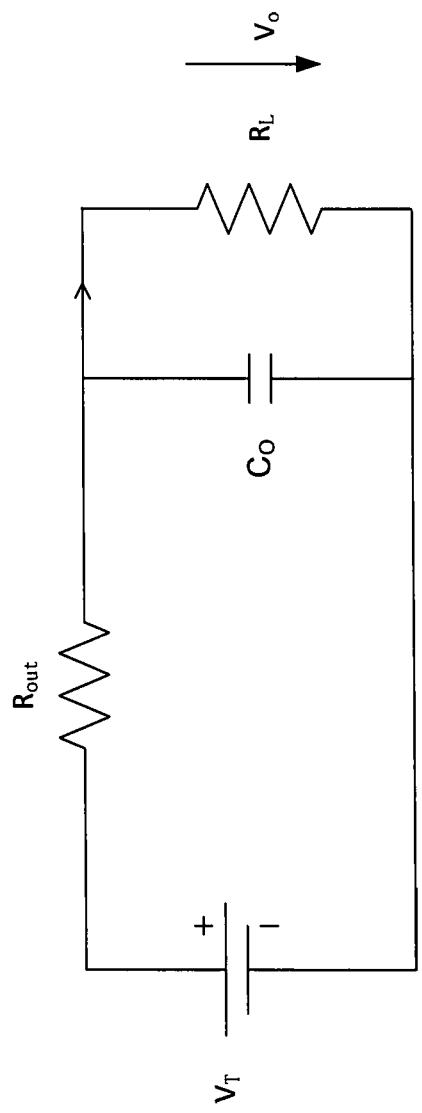
FIG. 4 illustrates an equivalent circuit of a voltage converter.
Figure 5:
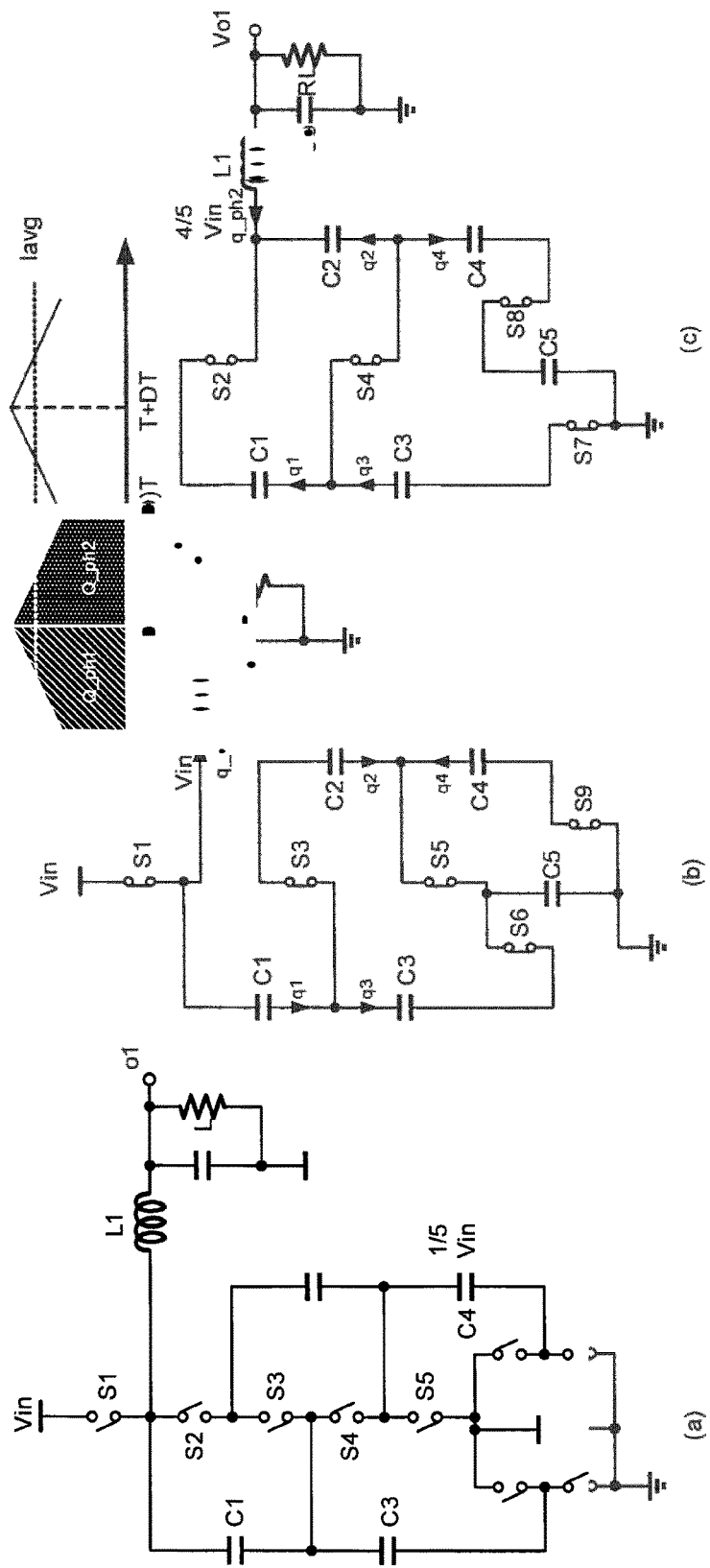
FIG. 5 illustrates a charge process of a first operating mode of the LED driver circuit shown in FIG. 4.
Figure 6:
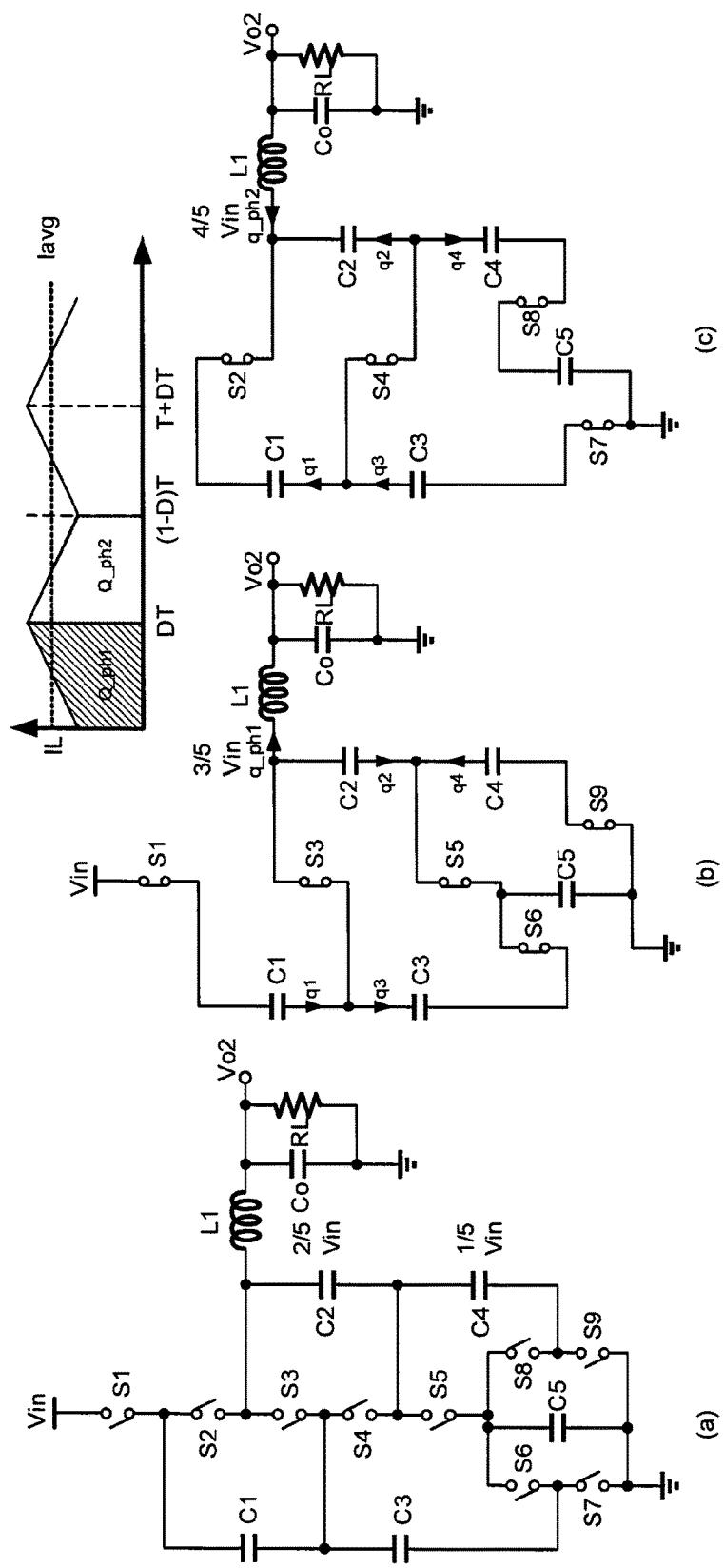
FIG. 6 illustrates a charge process of a second operating mode of the LED driver circuit shown in FIG. 4.
Figure 7:
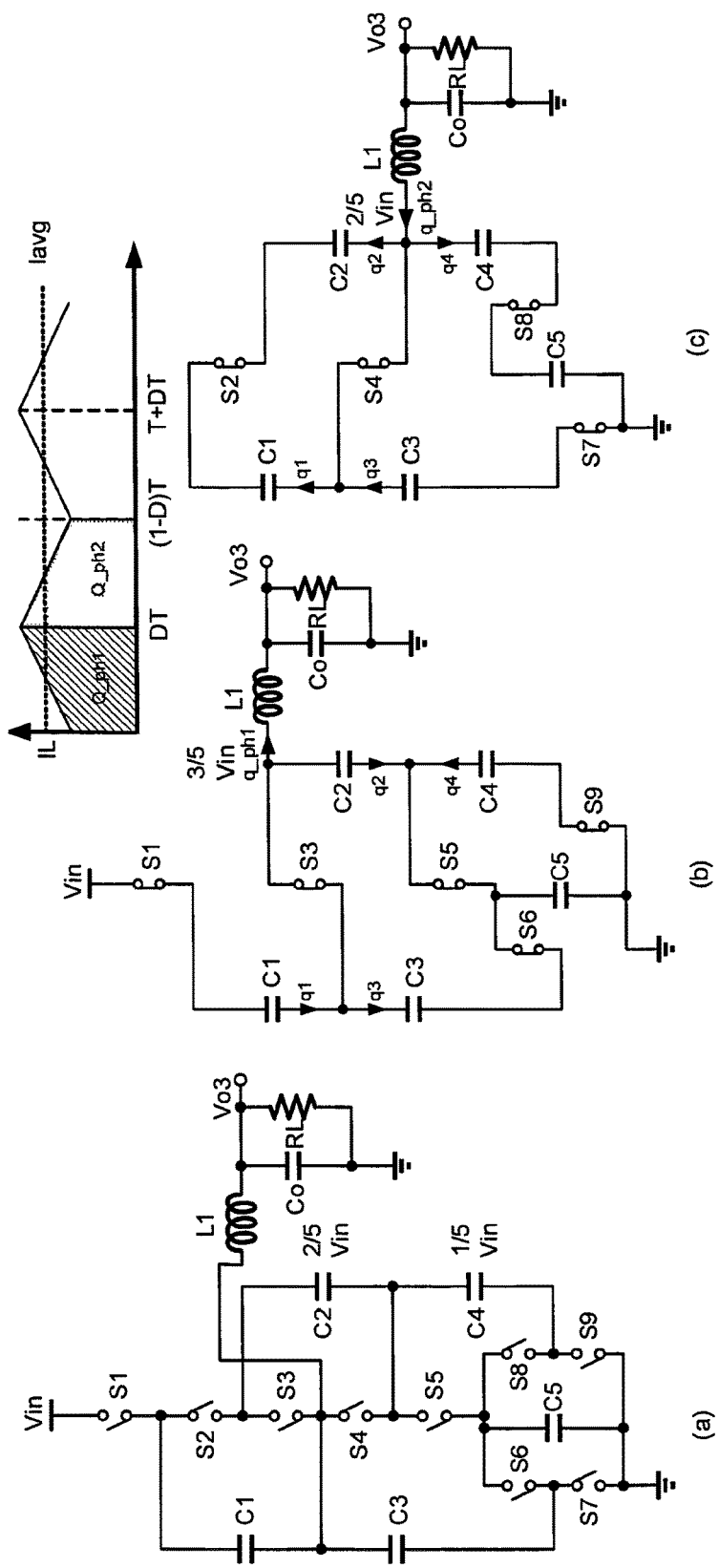
FIG. 7 illustrates a charge process of a third operating mode of the LED driver circuit shown in FIG. 4.
Figure 8:
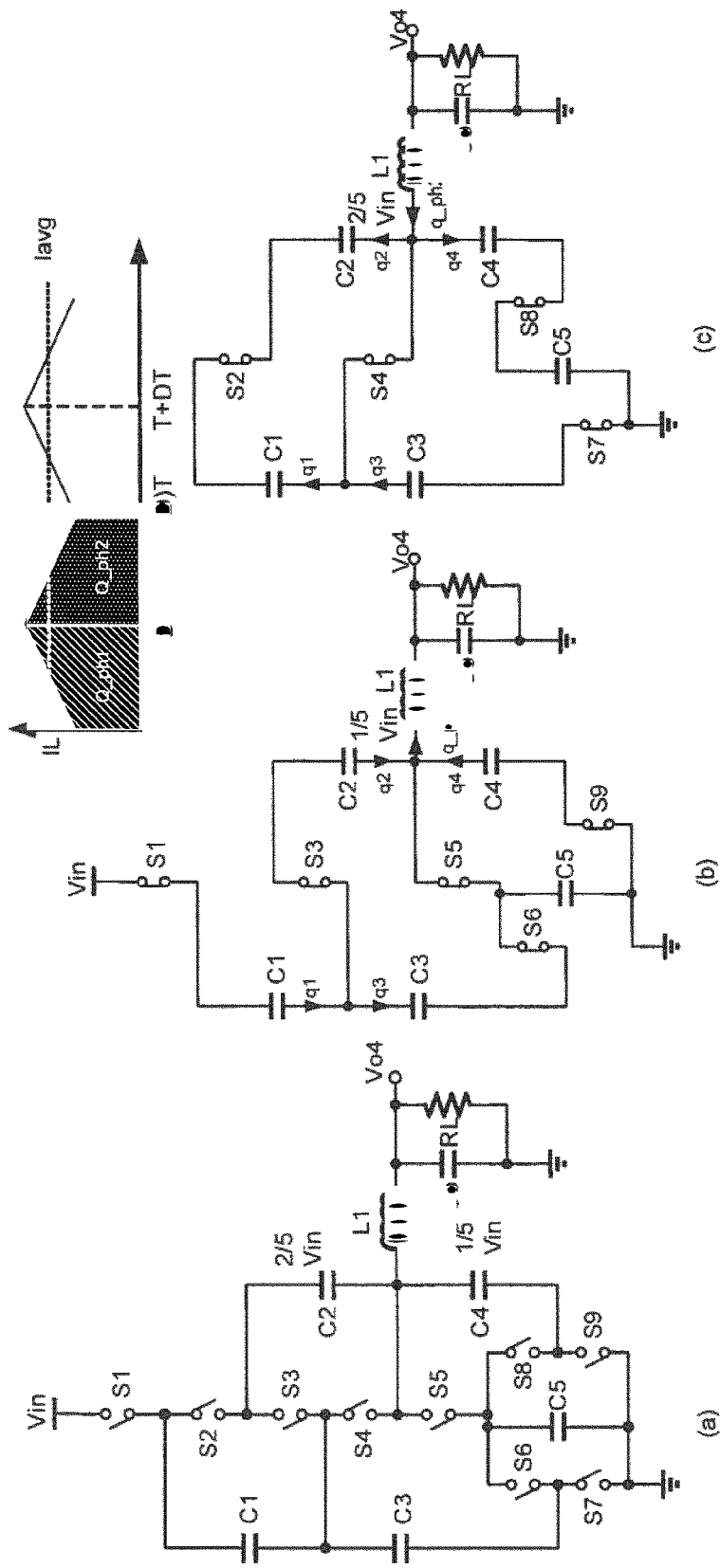
FIG. 8 illustrates a charge process of a fourth operating mode of the LED driver circuit shown in FIG. 4.
Figure 9:
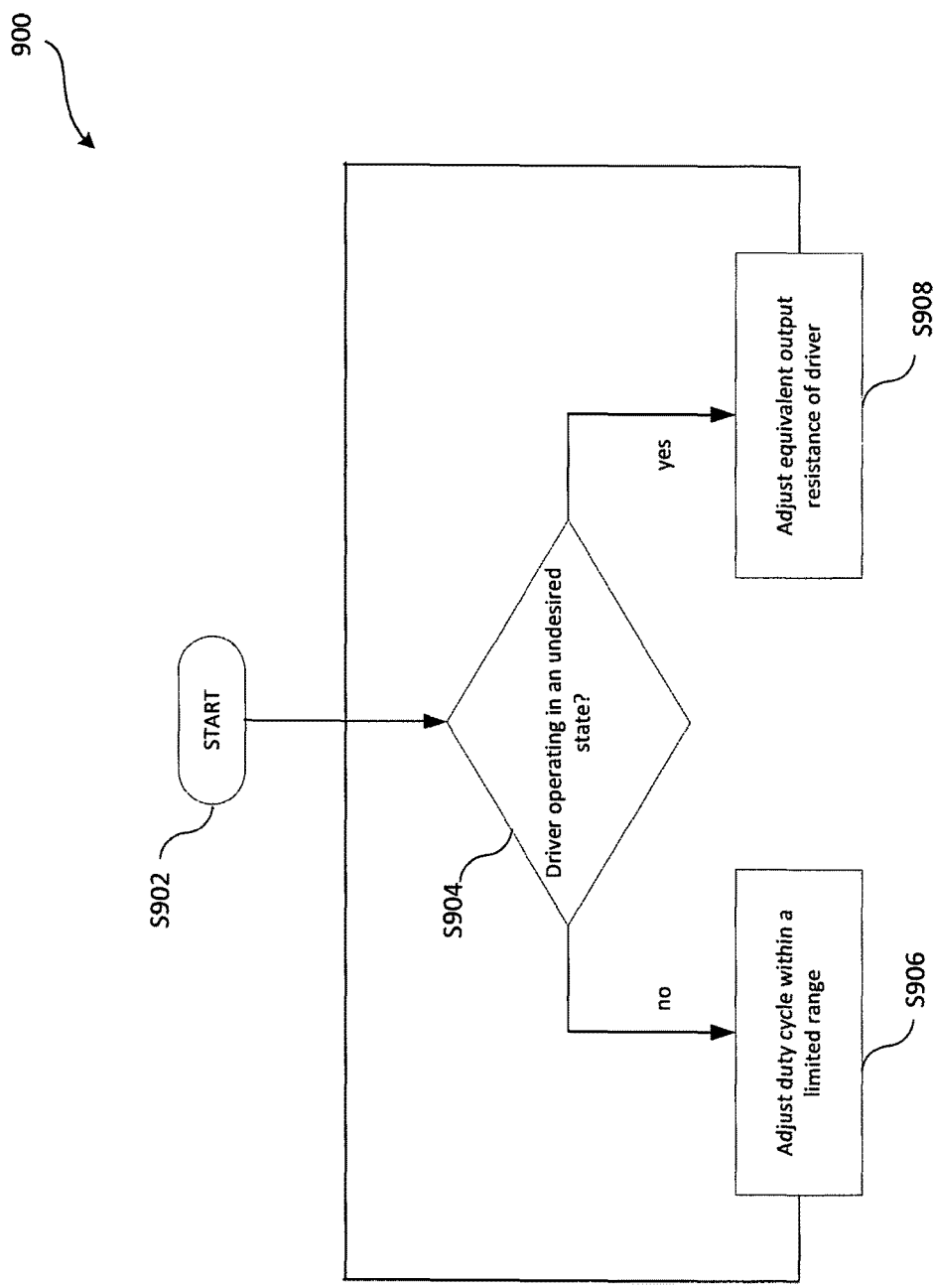
FIG. 9 illustrates a process according to an exemplary embodiment of the present invention to extend the operating range of a driver circuit.

An equivalent circuit of the driver circuit 201 is shown in FIG. 4. As shown in FIG. 4, the driver circuit 201 can be modelled, as an equivalent voltage source, defined as the target voltage $V_T$, connected in series with an equivalent output resistance ($R_{out}$) that represents the internal power losses of the driving circuit 201 due to power dissipation in switch resistances and capacitors' equivalent series resistance (ESR). The output voltage $V_o$ of the driver circuit 201 can be expressed as:

$$V_o = V_T - R_{out} * I_L$$

FIGS. 5-8 shows the charge process of each operating mode of the driver circuit 201.

In particular FIGS. 5a-c shows the driver circuit 201 operating in a first operating mode, wherein S10 of the multiplexer 310 is closed and switches S11, S12, S13 of the multiplexer 310 are open, to provide an output voltage $V_{o1}$. In FIG. 5a all of switches S1-S9 are open. FIG. 5b illustrates the charge contribution of capacitors and switches with regards to $V_{o1}$ during a first time phase φ1 when the first PWM signal closes switches S1, S3, S5, S6, and S9, and the second PWM signal opens switches S2, S4, S7, and S8. FIG. 5c illustrates the charge contribution of capacitors and switches with regards to $V_{o1}$ during a second time phase φ2 when the first PWM signal opens switches S1, S3, S5, S6, and S9, and the second PWM signal closes switches S2, S4, S7, and S8.

FIGS. 6a-c shows the driver circuit 201 operating in a second operating mode, wherein S11 of the multiplexer 310 is closed and switches S10, S12, S13 of the multiplexer 310 are open, to provide an output voltage $V_{o2}$. In FIG. 6a all of switches S1-S9 are open. FIG. 6b illustrates the charge contribution of capacitors and switches with regards to $V_{o2}$ during a first time phase φ1 when the first PWM signal closes switches S1, S3, S5, S6, and S9, and the second PWM signal opens switches S2, S4, S7, and S8. FIG. 6c illustrates the charge contribution of capacitors and switches with regards to $V_{o2}$ during a second time phase φ2 when the first PWM signal opens switches S1, S3, S5, S6, and S9, and the second PWM signal closes switches S2, S4, S7, and S8.

FIGS. 7a-c shows the driver circuit 201 operating in a third operating mode, wherein S12 of the multiplexer 310 is closed and switches S10, S11, S13 of the multiplexer 310 are open, to provide an output voltage $V_{o3}$. In FIG. 7a all of switches S1-S9 are open. FIG. 7b illustrates the charge contribution of capacitors and switches with regards to $V_{o3}$ during a first time phase φ1 when the first PWM signal closes switches S1, S3, S5, S6, and S9, and the second PWM signal opens switches S2, S4, S7, and S8. FIG. 7c illustrates the charge contribution of capacitors and switches with regards to $V_{o3}$ during a second time phase φ2 when the first PWM signal opens switches S1, S3, S5, S6, and S9, and the PWM signal closes switches S2, S4, S7, and S8.

FIGS. 8a-c shows the driver circuit 201 operating in a fourth operating mode, wherein S13 of the multiplexer 310 is closed and switches S10, S11, S12 of the multiplexer 310 are open, to provide an output voltage $V_{o4}$. In FIG. 8a all of switches S1-S9 are open. FIG. 8b illustrates the charge contribution of capacitors and switches with regards to $V_{o4}$ during a first time phase φ1 when the first PWM signal closes switches S1, S3, S5, S6, and S9, and the second PWM signal opens switches S2, S4, S7, and S8. FIG. 8c illustrates the charge contribution of capacitors and switches with regards to $V_{o4}$ during a second time phase φ2 when the first PWM signal opens switches S1, S3, S5, S6, and S9, and the second PWM signal closes switches S2, S4, S7, and S8.

The output voltage in each of the four operating modes referred to above can be expressed as:

$$V_{o1} = V_{in} * M_1 - R_{out1} * I_L$$

$$V_{o2} = V_{in} * M_2 - R_{out2} * I_L$$

$$V_{o3} = V_{in} * M_3 - R_{out3} * I_L$$

$$V_{o4} = V_{in} * M_4 - R_{out4} * I_L$$

Where $V_{o(n)}$ is the output voltage at operating mode n, $M_{(n)}$ is the conversion ratio at operating mode n, $R_{out(n)}$ is the equivalent output resistance at operating mode n, and $I_L$ is the load current.

As shown in the formulas above, a specific output voltage is dependent on the conversion ratio, load current and equivalent output resistance.

By using Kirchhoff Charge Law (KQL), the output voltage of each operating mode can be written as:

$$V_{o1} = 4/5 V_{IN} + 1/5 V_{IN} D - \alpha_1(D) R_{ds,on} I_o$$

$$V_{o2} = 4/5 V_{IN} - 1/5 V_{IN} D - \alpha_2(D) R_{ds,on} I_o$$

$$V_{o3} = 2/5 V_{IN} + 1/5 V_{IN} D - \alpha_3(D) R_{ds,on} I_o$$

$$V_{o4} = 2/5 V_{IN} - 1/5 V_{IN} D - \alpha_4(D) R_{ds,on} I_o$$

Where, $V_{in}$ is the input voltage, D is the duty cycle, $R_{ds,\,on}$ is the turn-on resistance of the switches S1-S9 of the voltage converter 300, and $I_o$ is the output current, respectively. Coefficient α(D) is:

$$\alpha_1(D) = \frac{-2D^3 + 25D^2 - 71D + 47}{25D(1-D)}$$

$$\alpha_2(D) = \frac{-D^3 + 14D^2 - 29D + 31}{25D(1-D)}$$

$$\alpha_3(D) = \frac{-D^3 + 73D^2 - 55D + 34}{25D(1-D)}$$

$$\alpha_4(D) = \frac{-D^3 + 10D^2 - 33D + 34}{25D(1-D)}$$

From the formulas above, it can be seen that the output voltage and equivalent output resistance ($R_{out}$) are both duty cycle dependant. When the duty cycle is close to the boundaries, e.g. 0 or 1, the output voltage will reduce to zero and the equivalent output resistance will be infinite, resulting in extremely limited performance of the driver circuit 201.

Known control strategies of converters will often minimize $R_{out}$, in order to reduce the losses and/or to provide a stable, load-independent output signal.

Reference is now made to a process 900 implemented by the present invention to close the above described efficiency gaps to extend the operating range of the driver circuit 201. The process 900 starts at step S902 and proceeds to step S904 where the controller 202 determines whether the driver circuit 201 is operating in an undesired state caused by a combination of the duty cycle, D and the operating mode of the voltage converter 300.

The controller 202 may employ various methods to determine whether the driver circuit 201 is operating in a desired or undesired state.

The controller 202 is configured to determine a required conversion ratio, M based on the input voltage, $V_{in}$ (received via first input signal 214) and the target voltage, $V_T$ (received via second input signal 216). In one embodiment, the controller 202 makes the determination at step S904 by comparing the required conversion ratio, M is compared with known conversion ratio ranges associated with the driver circuit 201 operating in desired and undesired states. This enables the controller 202 to determine whether the required conversion ratio, M is associated with a desired or an undesired operating state of the driver circuit 201. The information relating to the known conversion ratio ranges associated with desired and undesired operating states of the driver circuit 201 may be stored in a memory (not shown in FIG. 2) coupled to the controller 202

The controller 202 is configured to determine a duty cycle, D to achieve the required conversion ratio, M. In an alternative embodiment, the controller 202 makes the determination at step S904 by comparing the duty cycle, D with known duty cycle ranges that are associated with the driver circuit 201 operating in desired and undesired states based on the driver circuit 201 being configured to provide a target voltage $V_T$. This enables the controller 202 to determine whether the duty cycle, D is associated with a desired or an undesired operating state of the driver circuit 201. The information relating to the known duty cycle, D ranges associated with desired and undesired operating states of the driver circuit 201 may be stored in the memory referred to above.

In a further embodiment, the controller 202 makes the determination at step S904 by detecting the input voltage $V_{in}$ (received via first input signal 214) and comparing the input voltage $V_{in}$ with known input voltage ranges that are associated with the driver circuit 201 operating in desired and undesired states based on the driver circuit 201 being configured to provide a target voltage $V_T$. The information relating to the input voltage ranges associated with desired and undesired operating states of the driver circuit 201 may be stored in the memory referred to above.

In yet a further embodiment, the controller 202 is configured to dynamically determine the efficiency of the driver circuit 201 based on the target voltage, $V_T$ (received via second input signal 216) and the output voltage $V_o$ (received via third input signal 218). The controller 202 is configured to make the determination at step S904 by comparing the determined efficiency to a predetermined threshold efficiency level, and if the determined efficiency is greater than, or equal to, the predetermined threshold efficiency level, the controller 202 determines that the driver circuit 201 is operating in a desired state, otherwise the the controller 202 determines that the driver circuit 201 is operating in an undesired state.

If the controller 202 determines that the driver circuit 201 is operating in a desired state at step S904 (i.e. not an undesired state), the process 900 proceeds to step S906.

At step S906, the controller 202 supplies the generated first PWM signal and second PWM signal to the appropriate switches of the driver circuit 201 (as shown by connection 206a in FIG. 2). Whilst the driver circuit 201 is operating in a desired state, the controller adjusts the duty cycle, D to achieve to achieve the required conversion ratio, M. To avoid operating in an undesired region, the controller 202 limits the duty cycle, D within a limited duty cycle range. The upper boundary of the limited duty cycle range being smaller than 1 and the lower boundary of the duty cycle range being greater than 0. For example the limited duty cycle range may be limited to 0.2≤D≤0.8. It will be appreciated that this limited duty cycle range is merely an example.

Referring back to step S904, if the controller 202 determines that the driver circuit 201 is operating in an undesired region of an operating mode, the process 900 proceeds to step S908.

At step S908, the controller 202 supplies the generated first PWM signal and second PWM signal to the resistance adjustment circuit 210 (as shown by connection 206b in FIG. 2) and the resistance adjustment circuit 210 adjusts the equivalent output resistance, $R_{out}$ of the driver circuit 201 to enhance the efficiency of the driver circuit 201.

From the formulas above it can be seen that the equivalent output resistance, $R_{out}$, is a function of the duty cycle and the $R_{ds,\,on}$ of the switches S1-S9.

In one embodiment, the resistance adjustment circuit 210 comprises gate drivers to provide a gate drive voltage $V_g$ to each of the switches. The gate drivers associated with switches S1, S3, S5, S6, and S9 are configured to receive as an input the first PWM signal from the controller 202, whereas the gate drivers associated with switches S2, S4, S7, and S8 are configured to receive as an input the second PWM signal from the controller 202. The gate drivers are configured to output the PWM signal that they receive to the gate terminal of its associated switch. The PWM signal output from each gate driver has an output voltage amplitude corresponding to the voltage source of the gate driver ($V_{GS}$). As will be appreciated by persons skilled in the art gate drivers may take many forms, one of the most popular and cost-effective gate driver is a bipolar, non-inverting totem-pole driver.

The $R_{ds,on}$ of the switches S1-S9 is a function of $V_{GS}$ of the gate drivers used to provide the PWM signals to the switches S1-S9. In this embodiment, the resistance adjustment circuit 210 controls the gate drive voltage output to switches of the voltage converter 300 by controlling $V_{GS}$ of the gate drivers to adjust the equivalent output resistance, $R_{out}$ of the voltage converter 300 and thus the driver circuit 201. For example, the resistance adjustment circuit 210 may comprise a shunt regulator configured to receive the error signal 209 at its reference terminal and regulate $V_{GS}$. As will be known to persons skilled in the art, increasing the gate drive voltage input to a switch, decreases the $R_{ds,\,on}$ of the switch.

In another embodiment, the resistance adjustment circuit 210 adjusts the switching frequency of the switches S1-S9 to adjust the equivalent output resistance, $R_{out}$ of the voltage converter 300 and thus the driver circuit 201. For example, the resistance adjustment circuit 210 may comprise a voltage controlled oscillator (VCO) configured to receive the error signal 209. Thus the oscillation frequency of the VCO is controlled by the error signal 209. Logic circuitry may be used to combine the first PWM signal received from the controller 202 with the voltage controlled oscillator output signal received from the VCO to provide a driver signal for the switches S1, S3, S5, S6, and S9. Similarly, this logic circuitry may be used to combine the second PWM signal received from the controller 202 with the voltage controlled oscillator output signal received from the VCO to provide a driver signal for the switches S2, S4, S7, and S8. By increasing the switching frequency of the switches S1-S9 the resistance adjustment circuit 210 decreases the equivalent output resistance, $R_{out}$ of the voltage converter 300. The operation of the voltage converter, for example formed by a switched capacitor converter, can be modelled with two operating modes, delimited by a switching frequency limit: a fast switching mode and a slow switching mode. The switching frequency limit $f_s$ can be expressed as:

$$f_s = 3 \cdot Ron * C_f,$$

where Ron is the turn-on resistance of the switches and $C_f$ is the capacitance of the flying capacitors.

When the switching frequency is below the switching frequency limit $f_s$, then for every cycle, the flying capacitors can be fully charged, so the voltage converter operates in so-called slow switching mode. In this mode, the equivalent output resistance can be significantly reduced by increasing the switching frequency. When the switching frequency is above the switching frequency $f_s$, then for every cycle, the flying capacitors cannot be fully charged, and the voltage converter operates in so-called fast switching mode. In this mode, the equivalent output resistance can be gradually reduced by increasing the switching frequency.

In another embodiment, the resistance adjustment circuit 210 comprises circuitry to adjust the dead time associated with the voltage converter 300 to adjust the equivalent output resistance, $R_{out}$ of the voltage converter 300 and thus the driver circuit 201. The dead time of the voltage converter 300 refers to the time period during a switching transition when the first set of switches (S1, S3, S5, S6, S9) and the second set of switches (S2, S4, S7, and S8) are both are open. By increasing the dead time associated with the voltage converter 300 the resistance adjustment circuit 210 increases the equivalent output resistance, $R_{out}$ of the voltage converter 300.

At step S908 the controller 202 limits the duty cycle, D within the limited duty cycle range referred to above. In particular, the controller 202 may keep the duty cycle, D constant within the limited duty cycle range. For example the controller 202 may set the duty cycle, D to be at the lowest possible duty cycle in the limited duty cycle range (0.2 in the example provided above), at the highest possible duty cycle in the limited duty cycle range (0.8 in the example provided above), or at a constant duty cycle between the lowest possible duty cycle and the highest possible duty cycle in the limited duty cycle range—this is application dependent.

Figure 10:
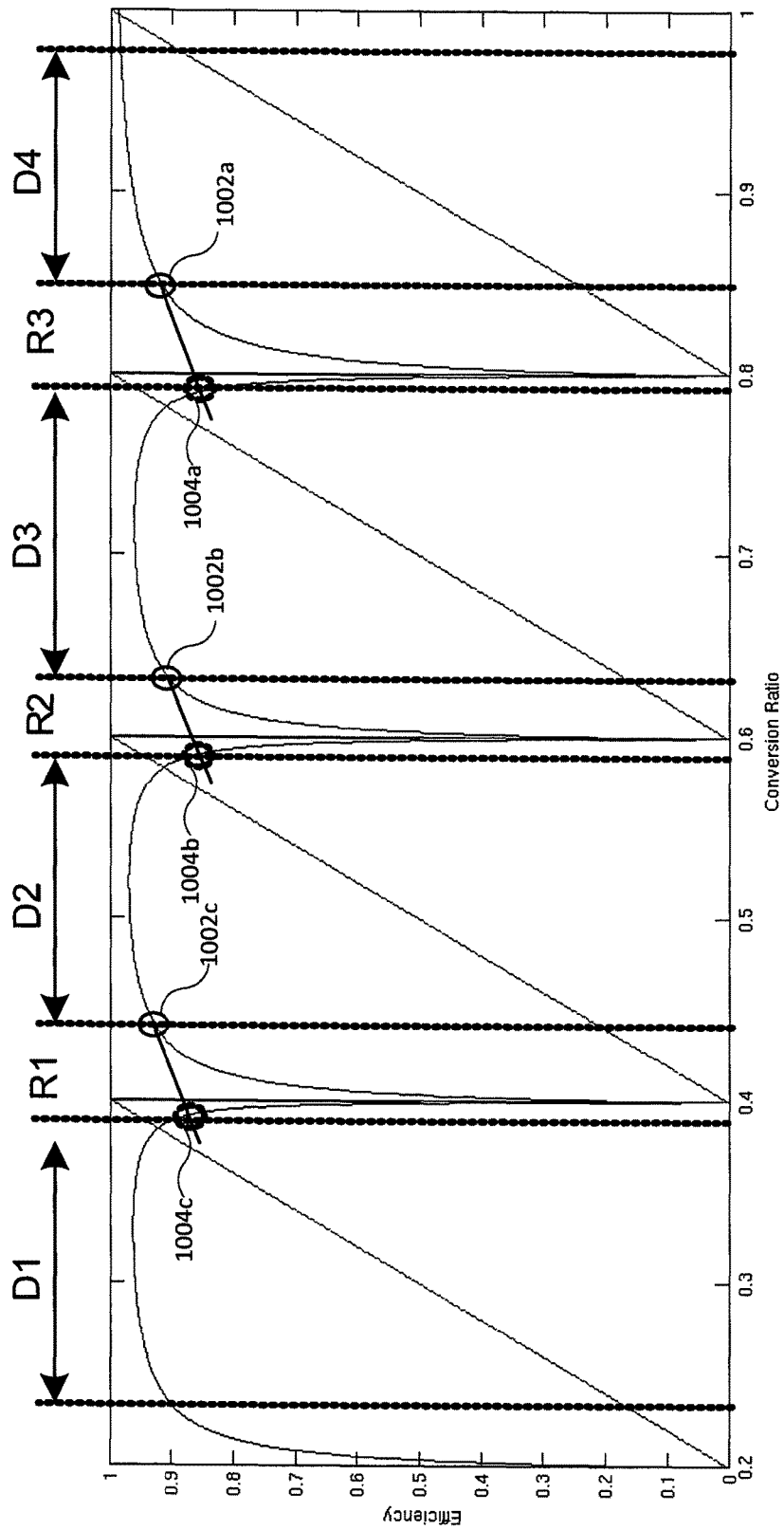
FIG. 10 shows the result of efficiency enhancement by using the process illustrated in FIG. 9.

FIG. 10 shows the result of efficiency enhancement by using the process 900. Four operating modes are divided into seven states, where D1, D2, D3 and D4 are regarded as desired states of operation of the driver circuit 201, and R1, R2, R3 are regarded as undesired states of operation of the driver circuit 201. As described above, whether the driver circuit 201 is operating in a desired or undesired operating state is classified by an operating condition such as efficiency, conversion ratio, duty cycle etc.

Looking at FIG. 10 from right to left it can be seen that when regulating a constant output voltage, as the input voltage increases further from the required output voltage whilst the driver circuit 201 is operating in a desired state D4 of the fourth operating the required conversion ratio, M is decreased by decreasing the duty cycle of the first PWM signal and the second PWM signal within a limited duty cycle range (referred to above). Whilst in the desired state D4, the controller 202 is configured to supply the first PWM signal and the second PWM signal to the driver circuit 201 (shown by connection 206*a*).

At edge point 1002*a* the controller 202 determines that the driver circuit 201 is operating in an undesired state of the fourth operating mode and supplies the first PWM signal and the second PWM signal to the resistance adjustment circuit 210 (shown by connection 206*b*). The adjustment of the equivalent output resistance of the driver circuit 201 is implemented by the resistance adjustment circuit 210 until edge point 1004*a* is reached where the controller 202 determines that the driver circuit 201 is operating in a desired state D3 of the third operating mode.

As the input voltage increases further from the required output voltage whilst the driver circuit 201 is operating in a desired state D3 the required conversion ratio, M is decreased further by decreasing the duty cycle of the first PWM signal and the second PWM signal within a limited duty cycle range (referred to above). Whilst in the desired state D3, the controller 202 is configured to supply the first PWM signal and the second PWM signal to the driver circuit 201 (shown by connection 206*a*).

At edge point 1002*b* the controller 202 determines that the driver circuit 201 is operating in an undesired state of the third operating mode and supplies the first PWM signal and the second PWM signal to the resistance adjustment circuit 210 (shown by connection 206*b*). The adjustment of the equivalent output resistance of the driver circuit 201 is implemented by the resistance adjustment circuit 210 until edge point 1004*b* is reached where the controller 202 determines that the driver circuit 201 is operating in a desired state D2 of the second operating mode.

As the input voltage increases further from the required output voltage whilst the driver circuit 201 is operating in a desired state D2 the required conversion ratio, M is decreased further by decreasing the duty cycle of the first PWM signal and the second PWM signal within a limited duty cycle range (referred to above). Whilst in the desired state D2, the controller 202 is configured to supply the first PWM signal and the second PWM signal to the driver circuit 201 (shown by connection 206*a*).

At edge point 1002*c* the controller 202 determines that the driver circuit 201 is operating in an undesired state of the second operating mode and supplies the first PWM signal and the second PWM signal to the resistance adjustment circuit 210 (shown by connection 206*b*). The adjustment of the equivalent output resistance of the driver circuit 201 is implemented by the resistance adjustment circuit 210 until edge point 1004*c* is reached where the controller 202 determines that the driver circuit 201 is operating in a desired region D1 of the second operating mode.

As shown in FIG. 10, the adjustment of the equivalent output resistance by the resistance adjustment circuit 210 enables a desired output voltage to be output from the driver circuit 201 given a particular input voltage and thus extends the range of conversion ratios that can be used by the voltage converter 300 without a significant loss in efficiency.

The exemplary mode of operation described hereafter, still with reference to FIG. 10, provides a better understanding on how the driver circuit 201 allow achieving output voltages by either adjusting duty cycle in desired regions or equivalent output resistance in undesired regions. As described above with reference to FIG. 2, the controller 202 receives the input voltage $V_{in}$ as a first input signal 214, the target voltage $V_T$ as a second input signal 216, and the output voltage $V_o$ as a third input signal 218. Based on the input voltage $V_{in}$ and the target voltage $V_T$, the control module is configured to dynamically determine a required conversion ratio M (where $M=V_T/V_{in}$). The controller 202 is configured to dynamically determine a mode of operation and duty cycle D that is needed to provide the required conversion ratio M (the conversion ratio M is proportional to the duty cycle with each operating mode). It will be appreciated that the controller 202 may be pre-configured with the target voltage $V_T$, and in such scenarios the controller 202 may not receive the target voltage $V_T$ using the second input signal 216. In accordance with the required range of the conversion ratio M, the controller 202 can determine in which operation mode the driver circuit 201 shall operate.

In the non-limiting example illustrated by FIG. 10, if the required conversion ratio M is between 0.84 and 0.96, then the driver circuit 201 shall operate in the fourth desired region D4, thereby adjusting the conversion ratio through varying the duty cycle. If the required conversion ratio M is between 0.76 and 0.84, then the driver circuit 201 shall operate in the third undesired mode R3, wherein the switches S1 to S13 of the driver circuit 201 are operated in a way similar as described above with reference to FIG. 2, i.e. in a way similar as in the fourth desired region D4, but while having the resistance adjustment circuit 210 increasing the equivalent output resistance, for instance by reducing $V_{GS}$ voltage, or by decreasing switching frequency, or increasing the dead time associated with the voltage converter. If the required conversion ratio is between 0.64 and 0.76, then the driver circuit 201 shall operate in the third desired region D3, thereby adjusting the conversion ratio through varying the duty cycle. If the required conversion ratio M is between 0.56 and 0.64, then the driver circuit 201 shall operate in the second undesired mode R2, wherein the switches S1 to S13 of the driver circuit 201 are operated in a way similar as described above with reference to FIG. 2, i.e. in a way similar as in the third desired region D3, but while having the resistance adjustment circuit 210 increasing the equivalent output resistance, for instance by reducing $V_{GS}$ voltage, or by decreasing switching frequency, or increasing the dead time associated with the voltage converter. If the required conversion ratio is between 0.44 and 0.56, then the driver circuit 201 shall operate in the second desired region D2, thereby adjusting the conversion ratio through varying the duty cycle. If the required conversion ratio M is between 0.36 and 0.44, then the driver circuit 201 shall operate in the first undesired mode R1, wherein the switches S1 to S13 of the driver circuit 201 are operated in a way similar as described above with reference to FIG. 2, i.e. in a way similar as in the second desired region D2, but while having the resistance adjustment circuit 210 increasing the equivalent output resistance, for instance by reducing $V_{GS}$ voltage, or by decreasing switching frequency, or increasing the dead time associated with the voltage converter. If the required conversion ratio is between 0.24 and 0.36, then the driver circuit 201 shall operate in the first desired region D1, thereby adjusting the conversion ratio through varying the duty cycle.

Figure 11:
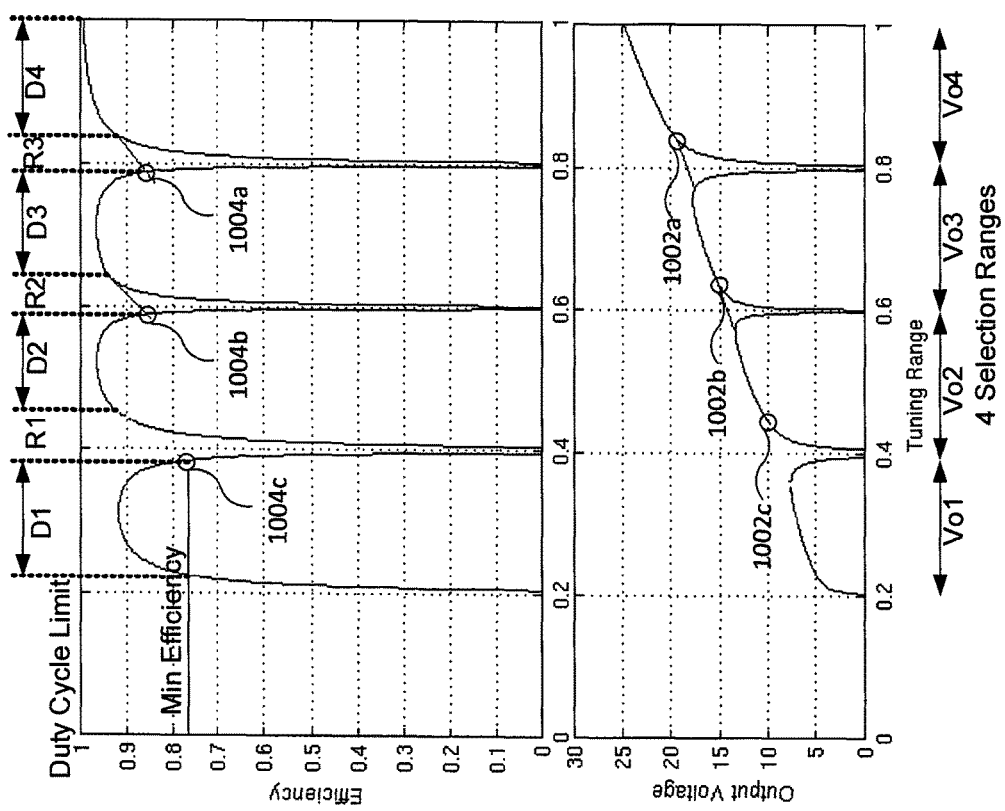
FIG. 11 illustrates how a continuous output voltage is output from the LED driver circuit shown in FIG. 3 according to exemplary embodiments of the present invention.

FIG. 11, illustrates how the combined equivalent output resistance adjustment and PWM control in accordance with embodiments of the present invention can achieve a continuous output voltage. That is, given an input voltage (e.g. 25V) as the conversion ratio is varied a continuous output voltage is output from the driver circuit 201, which would otherwise experience significant drops in output voltage (and thus significant drop in efficiency) during the undesired regions.

As shown by FIG. 11, the minimum efficiency (determined by the lowest cross point) is enhanced from 0% (as shown in FIG. 1) to 78%, meanwhile the operation range has a 20% extension, from 100% to 120%.

All the switches S1 to S13 as in the illustrated exemplary embodiment can be bi-directional and implemented in a suitable technology that is compatible with the switching frequency of the circuit. For instance the switches can be formed by Metal Oxide Semiconductor Field Effect Transistors (MOSFET) on a silicon substrate or High Electron Mobility Transistors (HEMT) on a Gallium-Nitride substrate.

All the reactive elements can be sized small enough to enable integration, for example as a Power System on a Chip (PSoC) or Power System in a Package (PSiP). In the illustrated exemplary embodiment, the capacitance for all capacitors can be set to 100 nF; the capacitance values can be further optimized in order to achieve a better performance. The inductance value of the filter inductor Lo can be set to 200 nH, making it possible to be printed in an LED sub-mount with a surface of 5×5 mm.

An LED as per any of the above described embodiments could also be a set of LEDs, for example a string of LEDs.

Whilst an example driver circuit is shown in FIG. 3, this is merely an example and embodiments of the invention are applicable to other driver circuits that comprise a SC power converter.

Whilst it is described above that the controller 202 is configured to generate the first PWM signal and second PWM signal (both supplied on connections 206a and 206b), these may be generated by a dedicated pulse width modulator based on receiving a duty cycle control signal from the controller 202.

Whilst embodiments of the present invention have been described above with respect to a driver circuit comprising a step-down voltage converter, embodiments of the present invention also apply to driver circuit comprising a step-up voltage converter.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A system comprising:
a driver circuit comprising switched capacitor a voltage converter having multiple operating modes;
a controller operable to control a ratio between an input voltage supplied to the driver circuit and a target output voltage to be output from the driver circuit by varying a duty cycle of a pulse width modulated signal, and by switching between operating modes of said voltage converter; wherein the controller is configured to determine that the driver circuit is operating in an undesired state caused by a combination of the duty cycle and the operating mode of the converter said undesired state corresponding to an efficiency below a threshold efficiency level; and
a resistance adjustment circuit configured to adjust an equivalent output resistance of the driver circuit in response to said determination.

2. The system according to claim 1, wherein the driver circuit is operable to provide an output voltage at a varying efficiency dependent on said ratio, wherein the undesired state corresponds to a region of a relationship between the efficiency and said ratio.

3. The system according to claim 1, wherein the resistance adjustment circuit is configured to adjust the equivalent output resistance of the driver circuit by controlling a gate drive voltage output to switches of the voltage converter.

4. The system according to claim 1, wherein the resistance adjustment circuit is configured to adjust the equivalent output resistance of the driver circuit by controlling a switching frequency of switches of the voltage converter.

5. The system according to claim 1, wherein the resistance adjustment circuit is configured to adjust the equivalent output resistance of the driver circuit by controlling a dead time associated with switches of the voltage converter.

6. The system according to claim 1, wherein the resistance adjustment circuit is configured to adjust the equivalent output resistance of the driver circuit based on receiving an error signal, said error signal generated based on comparing a reference voltage and a sense voltage.

7. The system according to claim 1, wherein the controller is configured to determine that the driver circuit is operating in an undesired state based on said ratio.

8. The system according to claim 1, wherein the controller is configured to determine that the driver circuit is operating in an undesired state based on the duty cycle of the pulse width modulated signal.

9. The system according to claim 1, wherein the controller is configured to determine that the driver circuit is operating in an undesired state based on the input voltage supplied to the driver circuit.

10. The system according to claim 1, wherein the controller is configured to determine that the driver circuit is operating in an undesired state based on determining the efficiency of the driver circuit.

11. The system according to claim 1, wherein the controller is configured to constrain the duty cycle of the pulse width modulated signal to be limited within a limited duty cycle range.

12. The system according to claim 1, wherein the controller is configured to constrain the duty cycle of a pulse width modulated signal to be at a constant value within said limited duty cycle range in response to determining that the driver circuit is operating in an undesired state.

13. The system according to claim 1, wherein said voltage converter is formed by a switched capacitor converter based on a Dickson ladder topology comprising a first set of switches and a second set of switches.

14. A light module comprising at least one light source and the system according to claim 1, wherein the driver circuit provides an output voltage that drives said at least one light source.

15. A non-transitory computer program product for controlling a driver circuit comprising a voltage converter, and a resistance adjustment circuit, the computer program product comprising code embodied on a computer-readable medium and being configured so as when executed on a processor to:
control a ratio between an input voltage supplied to the driver circuit and a target output voltage to be output from the driver circuit by varying a duty cycle of a pulse width modulated signal, and by switching between operating modes of said voltage converter;
determine that the driver circuit is operating in an undesired state caused by a combination of the duty cycle and the operating mode of the converter; and
supply the pulse width modulated signal to the resistance adjustment circuit to adjust an equivalent output resistance of the driver circuit in response to said determination.

* * * * *